United States Patent
Krause et al.

(10) Patent No.: US 7,885,189 B2
(45) Date of Patent: Feb. 8, 2011

(54) METHODS AND APPARATUS FOR RATE ESTIMATION AND PREDICTIVE RATE CONTROL

(75) Inventors: Edward A. Krause, San Mateo, CA (US); Anesh Sharma, Santa Clara, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 643 days.

(21) Appl. No.: 11/801,844

(22) Filed: May 11, 2007

(65) Prior Publication Data

US 2008/0068997 A1 Mar. 20, 2008

Related U.S. Application Data

(60) Provisional application No. 60/846,149, filed on Sep. 20, 2006.

(51) Int. Cl.
*G08C 15/00* (2006.01)

(52) U.S. Cl. .......................................... 370/232; 725/94

(58) Field of Classification Search ....................... None
See application file for complete search history.

(56) References Cited

U.S. PATENT DOCUMENTS

| | | | |
|---|---|---|---|
| 5,159,447 A * | 10/1992 | Haskell et al. ......... | 375/240.05 |
| 5,862,140 A | 1/1999 | Shen et al. | |
| 6,167,084 A | 12/2000 | Wang et al. | |
| 6,310,857 B1 * | 10/2001 | Duffield et al. ............. | 370/232 |
| 6,532,593 B1 | 3/2003 | Moroney | |
| 6,643,327 B1 | 11/2003 | Wang | |
| 6,688,714 B1 * | 2/2004 | Bailleul et al. ......... | 375/240.23 |
| 6,694,060 B2 * | 2/2004 | Liu et al. ..................... | 382/236 |
| 6,744,782 B1 | 6/2004 | Itakura et al. | |
| 6,839,070 B2 | 1/2005 | Meandzija et al. | |
| 6,847,656 B1 | 1/2005 | Wu et al. | |
| 6,925,501 B2 | 8/2005 | Wang et al. | |
| 6,996,779 B2 | 2/2006 | Meandzija et al. | |
| 7,020,198 B2 | 3/2006 | Wang et al. | |
| 7,068,660 B2 * | 6/2006 | Suni ......................... | 370/395.2 |
| 7,447,164 B2 * | 11/2008 | Ueda et al. .................. | 370/252 |
| 2003/0018772 A1 | 1/2003 | Meandzija et al. | |
| 2003/0235220 A1 | 12/2003 | Wu et al. | |
| 2006/0036759 A1 | 2/2006 | Shen et al. | |
| 2006/0050970 A1 * | 3/2006 | Gunatilake .................. | 382/232 |
| 2006/0088094 A1 * | 4/2006 | Cieplinski et al. ....... | 375/240.01 |
| 2006/0136970 A1 | 6/2006 | Salomons | |

* cited by examiner

*Primary Examiner*—Seema S Rao
*Assistant Examiner*—Rhonda Murphy
(74) *Attorney, Agent, or Firm*—Lipsitz & McAllister, LLC

(57) ABSTRACT

The present invention provides a balanced video distribution system, as well as corresponding methods and apparatus, which utilize feedback from the channel multiplexers as well as rate estimation and predictive rate control. Packets of a video stream are received at an input buffer. A transmission deadline is determined for the packets. A fullness level of the input buffer is also determined. A future time at which said packets can be transmitted may be estimated based on the buffer fullness level. A bit rate of the video stream can be adjusted based on the estimated future time and the transmission deadline. For example, the bit rate may be adjusted in proportion to a difference between the estimated future time and the transmission deadline.

31 Claims, 7 Drawing Sheets

METHODS AND APPARATUS FOR RATE ESTIMATION AND PREDICTIVE RATE CONTROL

This application claims the benefit of U.S. provisional patent application No. 60/846,149 filed on Sep. 20, 2006.

BACKGROUND

The present invention relates generally to the field of video distribution. In particular, the present invention provides a balanced video distribution system, as well as corresponding methods and apparatus, which utilize feedback from the channel multiplexers as well as rate estimation and predictive rate control.

In cable systems, multiple compressed video programs are combined to form multiplexes. Each multiplex is transmitted over a fixed-bandwidth channel to a network of receivers. Typically, a receiver decodes and displays one or more video programs by first tuning to a radio frequency corresponding to a selected multiplex, and then extracting the packets corresponding to the one or more selected program.

It is desirable to maximize the number of digitally compressed programs which can be transmitted over the available fixed-bandwidth channels. One way to increase the number of video programs is to improve the efficiency of the video compression process. Utilizing the most advanced video compression algorithms is desirable, but it is difficult to upgrade an installed base of video receivers. One way to improve the efficiency of a video compression system while maintaining compatibility with an installed base of network receivers, is to utilize variable bit-rate (VBR) encoding. With VBR, the compression ratio is increased when a particular scene is easily compressed, and similarly the compression ratio is reduced when a particular scene is complex and more difficult to compress. By allowing the instantaneous bit rate to vary in this way, VBR encoders are able to deliver more uniform video quality while encoding at a lower average bit rate.

Although VBR encoders are more efficient than constant bit-rate (CBR) encoders, it is more difficult to combine compressed VBR programs into multiplexes. If the multiplex is to be transmitted over a fixed-bandwidth channel, then the instantaneous data rate of the multiplex cannot exceed the data-rate capacity of the channel. In fact, if the goal is to maximize image quality at all times, then the aggregate multiplex data rate should remain constant at a rate matching the capacity of the channel. Statistical multiplexers are designed to achieve this result by broadcasting a "quality" setting to each VBR encoder. Assuming equal priorities among video encoders, the same quality setting would be conveyed to each, and the quality setting would be adjusted from time to time in order to maintain the desired aggregate data rate.

In many cases, video multiplexers are not co-located with the video encoders, or the programs to be multiplexed are pre-encoded, and therefore the encoding process cannot be regulated in order to achieve a desired aggregate data rate. If the compressed programs were generated using VBR encoders, then it can be difficult to insure that the aggregate data rate of each multiplex remains within the capacity of each corresponding communication channel. This problem is often addressed by utilizing sophisticated multiplexers with transrating capabilities. By coupling a transrater to some or all programs comprising a particular multiplex, it becomes possible to selectively reduce the date rate of the video programs. Such systems are often referred to as statistical remultipexers. In simple terms, a statistical remultiplexer reduces the bit rate of elementary video streams to be able to pack more elementary streams in a given transport stream. The MPEG standards allow requantization of existing video streams to achieve bit rate reduction. The level of quantization does not need to be fixed or constant. It is also unlikely that all the different streams peak, in terms of bitrate, at the same time. Statistics based algorithms could be deployed to calculate a level of quantization for each stream such that the transport stream bandwidth is utilized to its fullest while maintaining highest possible quality. There could be many different ways to calculate such a level of quantization. An efficient statistical remultiplexer is able to maximize the quality of each program in the multiplex, while insuring that the aggregate data rate remains within the capacity of the channel at all times.

Another way to increase the number of programs that can be transmitted over a limited number of channels, or to increase the video quality of the transmitted programs, is to optimize the process of assigning programs to the available transmission channels. Typically, a Session Resource Manager (SRM) selects the transmission channel, either by assuming a constant bit rate per program, or by basing the decision on the number of streams already allocated to each channel. Both methods are sub-optimal. In the first case, each program is assumed to be of a constant rate and the SRM simply sums the rate of each program comprising a particular multiplex to determine if sufficient excess bandwidth is available to accommodate the new program. This method is not easily applied to programs encoded using the more efficient VBR method, and attempts to do so usually result in under-utilized channels or lost data due to channel overflows. Assigning programs to transmission channels based on the number of programs per channel is also inefficient when applied to VBR programs. For example, each program may have a different average rate depending on image resolution or the type of content. For example, sports content is usually encoded at a higher frame rate and at a higher data rate in order to match the video quality of movies encoded at a much lower rate. Also, the SRM cannot account for instantaneous rate variations among each program and therefore cannot determine if sufficient bandwidth is available to accommodate worst case conditions.

It would be advantageous to provide a more effective way to efficiently allocate programs among available transmission channels while maximizing image quality.

The methods and apparatus of the present invention provide the foregoing and other advantages.

SUMMARY OF THE INVENTION

The present invention relates generally to the field of video distribution. In particular, the present invention provides a balanced video distribution system, as well as corresponding methods and apparatus, which utilize feedback from the channel multiplexers as well as rate estimation and predictive rate control.

In accordance with one example embodiment of the present invention, packets of a video stream are received at an input buffer. A transmission deadline is determined for the packets. A fullness level of the input buffer is also determined. A future time at which the packets can be transmitted may be estimated based on the buffer fullness level. A bit rate of the video stream can be adjusted based on the estimated future time and the transmission deadline. For example, the bit rate may be adjusted in proportion to a difference between the estimated future time and the transmission deadline.

In another example embodiment, a plurality of multiplexes may be formed and each multiplex may be comprised of at least one video stream. A current quality level setting may be determined for each multiplex based on the bit rate adjustments. A new video stream may be assigned to the multiplex that has the highest quality level setting. In addition, a video stream may be reassigned from a multiplex with a low quality level setting to a multiplex with a higher quality level setting.

The buffer fullness level may be indicative of the total amount of data in the input buffer. Alternatively, the buffer fullness level may be indicative of the portion of data in the input buffer which can be transrated to a lower rate.

In a further example embodiment, a program clock reference (PCR) for the video stream may provide a current time. The estimated future time may be provided by a predicted program clock reference (PPCR) derived from the current time and the buffer fullness level. The PPCR may be determined by adding the PCR value of the video stream to a value indicative of an amount of time needed to transmit all of the data corresponding to the buffer fullness level. The value indicative of an amount of time needed to transmit all of the data corresponding to the buffer fullness level may be determined by dividing the buffer fullness level by a channel transmission rate.

A decode time stamp (DTS) for a current frame of the video stream may provide the transmission deadline. A time difference may be determined by subtracting the PPCR from the DTS. The bit rate may be adjusted based on this time difference. The time difference determined from subtracting the PPCR from the DTS may comprise a proximity factor (PF).

The PF may be converted into a quality level Q having a value between 0 and N. The quality level Q may be provided in a feedback signal to a session resource manager for consideration when assigning new programs to one of a plurality of transmission channels and/or to a transrater for use in adjusting the bit rate of the video stream.

In addition, system latency may be accounted for when converting the proximity factor PF to the quality level Q.

In an additional example embodiment, multiple video streams may be received at corresponding input buffers. A program clock reference (PCR) value may be determined for at least one of the multiple video streams. A corresponding decode time stamp (DTSi) for a current frame of each of the multiple video streams may also be determined (where "i" denotes a particular one of the multiple streams). The decode time stamps (DTSis) and the program clock reference value (PCR) may be normalized to a common time base to obtain normalized DTSis and a normalized PCR.

A representative DTS may be determined for the multiple video streams based on the normalized DTSis. The representative DTS may comprise one of: (a) an average DTS obtained from averaging the normalized DTSis; (b) a median DTS obtained from taking a median value of the normalized DTSis; and (2) a minimum DTS obtained from taking a minimum DTS from the normalized DTSis.

The normalized PCR for at least one of the multiple video streams may provide a current time. The estimated future time may be provided by a predicted program clock reference (PPCR) derived from the current time and the buffer fullness levels from the input buffers.

A time difference may be determined by subtracting the PPCR from the representative DTS. The bit rate may be adjusted based on the time difference.

The PPCR may be determined by adding the normalized PCR to a value indicative of an amount of time needed to transmit all of the data corresponding to the buffer fullness levels from each of the input buffers. The value indicative of an amount of time needed to transmit all of the data corresponding to the buffer fullness levels from each of the input buffers is determined by summing the buffer fullness levels from each buffer to obtain a total buffer fullness level and then dividing the total buffer fullness level by a channel transmission rate.

The time difference determined from subtracting the PPCR from the representative DTS may comprise a proximity factor (PF). The PF may be converted into a global quality level Q having a value between 0 and N. The global Q may be provided in a feedback signal to one or more video processors for adjusting the bit rate of at least one of the multiple video streams. Alternatively or additionally, the global Q may be provided in a feedback signal to a session resource manager for use in managing the assignment of video streams to selected multiplexes.

System latency may be accounted for when converting the proximity factor PF to the global Q. Accounting for the system latency may comprise determining a latency factor LF for the system latency and calculating the global Q using the formula:

$$Q=((LF-PF)*N)/LF$$

The latency factor LF may be defined as LF=Constant*Latency.

For each of the multiple video streams, an MPEG quantizer scale code parameter may be set equal to the global Q in the event the global Q indicates a lower video quality level than an original MPEG quantizer scale code for the particular video stream.

In a further example embodiment in accordance with the present invention, at least one of an individual maximum quality level Qimax and an individual minimum quality level Qimin may be determined for each of the multiple video streams in addition to the global Q. The Qimax may be an indicator of a maximum video quality for a corresponding one of the multiple video streams. The Qimin may be an indicator of a minimum video quality for a corresponding one of the multiple video streams. Both of the Qimax and the Qimin may have an inverse relationship with video quality. For each of the multiple video streams:

$$Qi\min=((LF-PFi\min)*N)/LF$$

where PFimin comprises an individual minimum proximity factor.

$$Qi\max=((LF-PFi\max)*N)/LF$$

where PFimax comprises an individual maximum proximity factor.

$$PFi\min=DTSi-PPCRi\min$$

where PPCRimin comprises an individual minimum PPCR.

$$PFi\max=DTSi-PPCRi\max$$

where PPCRimax comprises an individual maximum PPCR.

For each of the multiple video streams (1) PPCRimin may be determined by adding the normalized PCR value to a value indicative of an amount of time needed to transmit all of the data corresponding to a buffer fullness level of the corresponding input buffer for the video stream at a specified minimum bit rate for the video stream; and (2) PPCRimax may be determined by adding the normalized PCR value to a value indicative of an amount of time needed to transmit all of the data corresponding to a buffer fullness level of the corresponding input buffer for the video stream at a specified maximum bit rate for the video stream.

When only Qimax is determined, Qimax may be selected when adjusting the bit rate of a particular video stream rather than the global Q if the Qimax for the particular stream indicates a lower quality image than the global Q. The global Q may be selected when adjusting the bit rate of a particular video stream if the global Q indicates a lower quality image than the Qimax for the particular stream.

When only Qimin is determined, Qimin may be selected when adjusting the bit rate of a particular video stream rather than the global Q if the Qimin for the particular stream indicates a higher quality image than the global Q. The global Q may be selected when adjusting the bit rate of a particular video stream if the global Q indicates a higher quality image than the Qimin for the particular stream.

When both Qimin and Qimax are determined, Qimin may be selected when adjusting the bit rate of a particular video stream if the Qimin for the particular stream indicates a higher quality image than either the global Q or the corresponding Qimax. Qimax may be selected when adjusting the bit rate of a particular video stream if the Qimax for the particular stream indicates a lower quality image than the global Q and a higher quality image than the corresponding Qimin. The global Q may be selected when adjusting the bit rate of a particular video stream if the global Q indicates a lower quality image than the Qimax and a higher quality image than the Qimin.

At least one of the global Q, the Qimin, and the Qmax may be adjusted based on a priority constant indicating a priority level of the particular video stream.

A multiplexer with transrating capabilities may be further optimized by distinguishing between the portion of data in the input buffer(s) which may be rate controlled and the portion which cannot. In many systems, the video data may be rate controlled but audio and other data types must be forwarded at the same rate at which they are received. This distinction may be advantageously applied in an example embodiment of the present invention by considering only the transratable data when deriving the predicted program clock reference (PPCR) from the normalized PCR and by adjusting the latency factor (LF) depending on the amount of non-transratable data in the input buffer(s). In such an example embodiment, LF may be defined as $LF = constant * (latency - B_{nx}/txrate)$, where $B_{nx}$ is an amount of non-transratable data in all of the input buffers combined and txrate is a capacity of the transmission channel.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
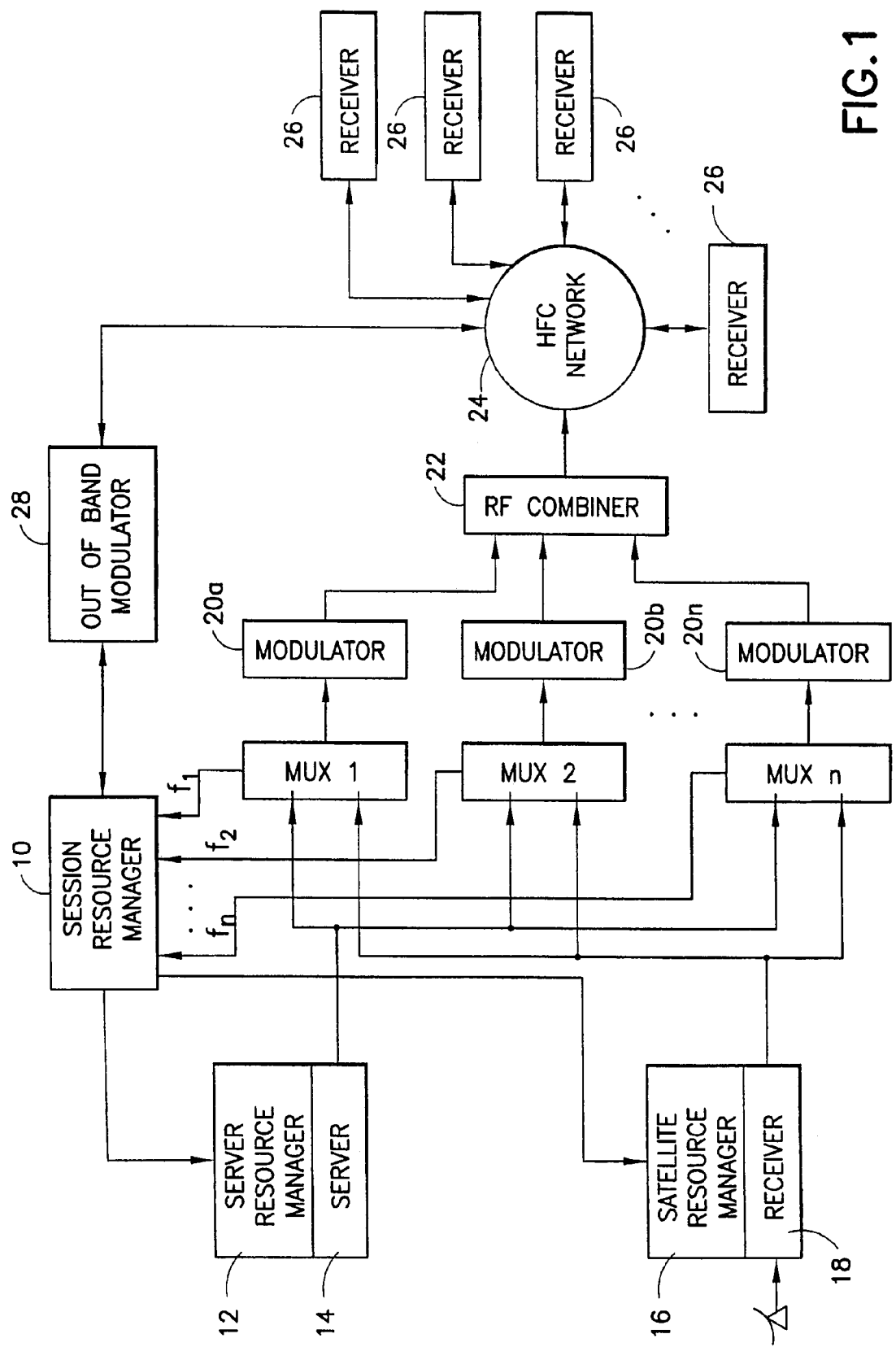
FIG. 1 shows an example embodiment of a system for allocating programs to available transmission channels.

The present invention provides a much more effective method for allocating programs to available transmission channels, which utilizes feedback from the channel multiplexers. FIG. 1 shows an example embodiment of such a system utilizing feedback (e.g., feedback signals $f_1, f_2, \ldots, f_n$) from the Channel Multiplexers (e.g., Mux 1, Mux 2, . . . , Mux n) to the Session Resource Manager (SRM) 10. The SRM 10 may be in communication with the source of the programs, such as, for example, a Server Resource Manager 12 and associated Server 14 and/or a Satellite Resource Manager 16 and associated receiver 18. The multiplexers Mux 1, Mux 2, . . . , Mux n assemble program multiplexes from programs received from a program source (e.g., the Server 14 and/or the Satellite Receiver 18) under the direction of the SRM 10. The respective program multiplexes are modulated at respective modulators 20a, 20b, . . . , 20n and combined at RF combiner 22 for communication over a communication network, such as a Hybrid Fiber Coaxial (HFC) network 24, to receivers 26. SRM 10 may communicate with the receivers 26 via an out-of-band modulator 28.

Figure 2:
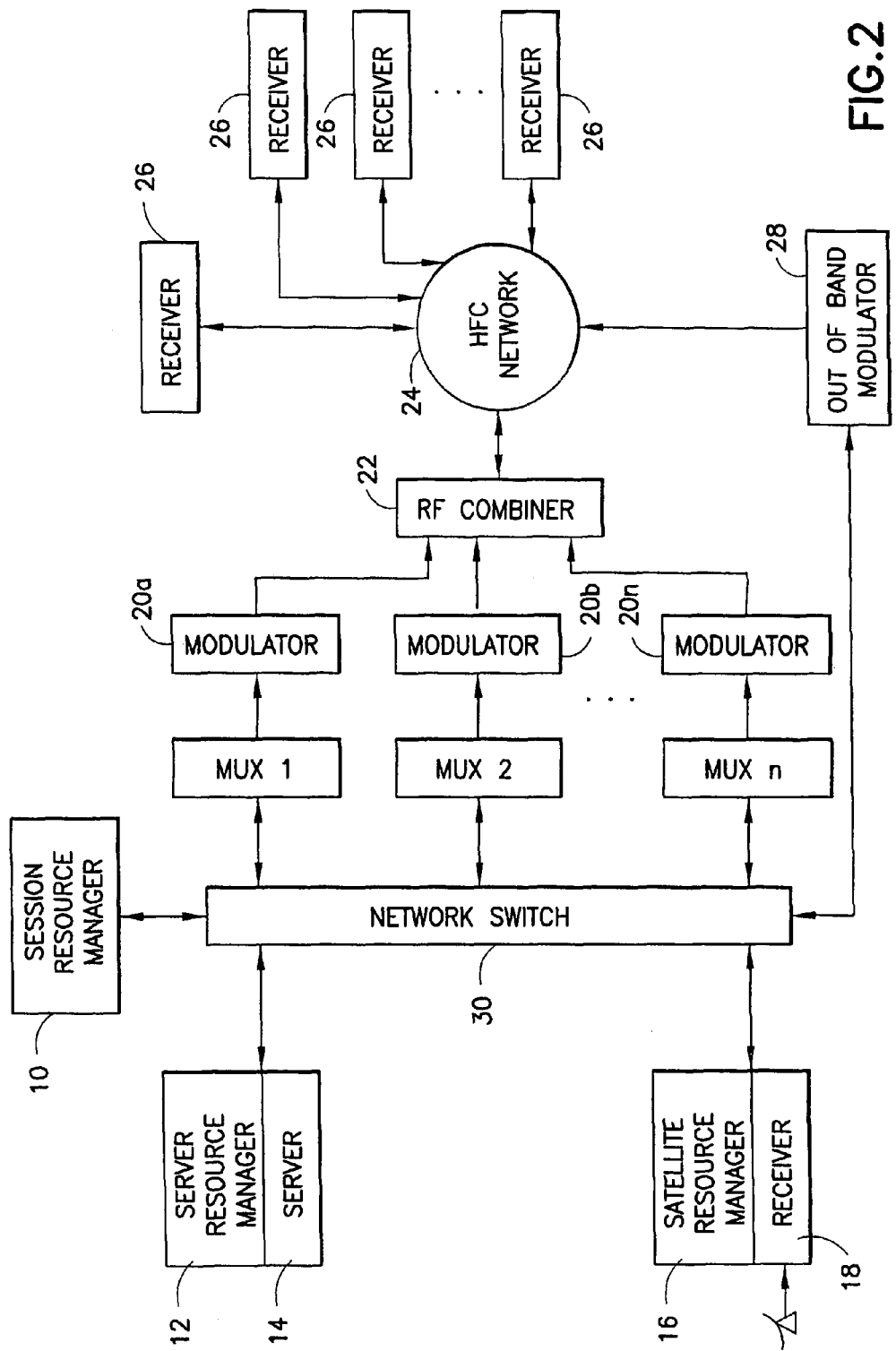
FIG. 2 shows a further example embodiment of a system for allocating programs to available transmission channels.

A further example embodiment of such a system is shown in FIG. 2. The example embodiment of FIG. 2 is the same system as shown in FIG. 1, but with a Network Switch (or router) 30 connecting the various system components. In the FIG. 2 example embodiment, the feedback information is encapsulated into IP packets and conveyed from the multiplexers Mux 1, Mux 2, . . . Mux n to the SRM 10 via the Network Switch (or router) 30.

If the multiplexer does not include transrating capabilities, then the feedback parameters should be representative of the likelihood of a channel overflow condition. Ideally, the estimate should not only consider the programs that have already been allocated to the multiplex, but also the new program which is being considered for inclusion. As a simple example, the feedback parameter provided from the multiplexer (e.g., Mux 1) to the SRM 10 could be computed as a simple sum of the average bit rates observed for each component program over a recent time interval. If the SRM 10 is aware of the average rate corresponding to a new candidate program, then this rate could be summed with the feedback parameters returned from each multiplexer (Mux 1, Mux 2, . . . , Mux n), and the SRM 10 could then select the multiplexer having the lowest corresponding sum and add the new candidate program to that multiplex. More sophisticated estimates representative of the probability of a channel overflow condition might also consider the variability of the rate of each component stream when observed over a recent time interval. Additional risk factors, such as content type and encoding profiles could also be considered.

In an alternate embodiment of the invention, the process of estimating the feedback parameters can be more closely integrated with the multiplexing process. Typically, an efficient multiplexer will prioritize the incoming programs and will always choose to send the next packet of the stream that is currently assigned a highest priority level. Sometimes it will not be possible to send a packet with highest priority, since this could cause the overflow of a buffer used for receiving packets at the set-top decoder, or it could result in the violation of other rules imposed by standards designed to insure compatibility with receiving systems. In such cases, the next packet corresponding to a program in the next highest priority classification would be selected. In fact, such multiplexers are designed to avoid sending groups of idle characters (null packets) unless no other options are available.

Figure 3:
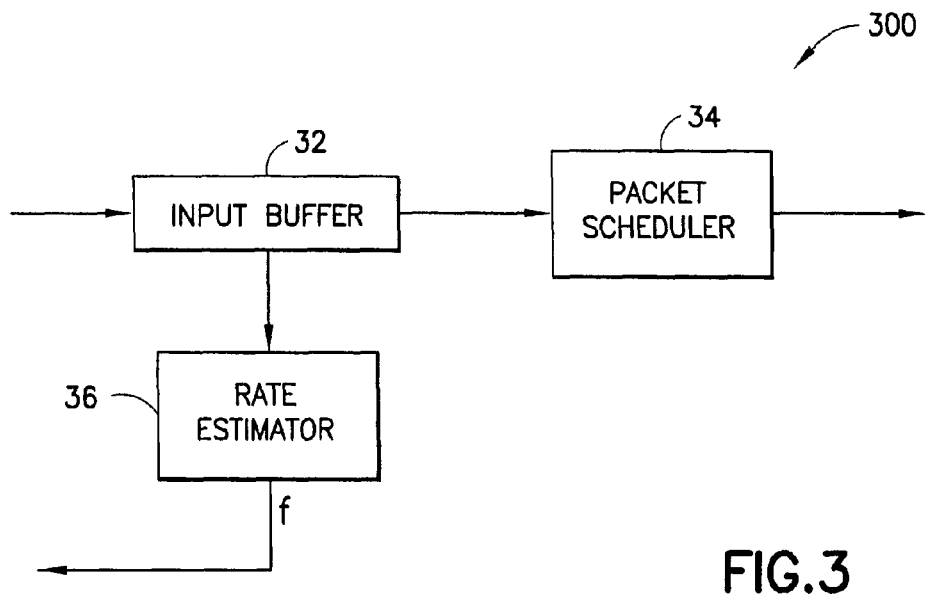
FIG. 3 shows a block diagram of an example embodiment of a multiplexer for use in the system of FIGS. 1 and 2.

A simplified drawing of an example embodiment of such a multiplexer 300 is shown in FIG. 3. Incoming program packets are received by an Input Buffer 32 and stored until retrieved by a Packet Scheduler 34. The Packet Scheduler 34 emits packets at the exact rate corresponding to the transmission channel. If this rate is sufficient to accommodate all of the incoming packets, then the Input Buffer 32 will remain close to empty. However, if the rate begins to exceed the rate of the channel, then the fullness of the Input Buffer 32 will begin to increase. Packet schedulers are well known in the art. An example packet scheduler is discussed in U.S. Pat. No. 5,862,140.

A Rate Estimator 36 is used to generate the feedback parameter (f) to the SRM 10 based on the fullness of the Input Buffer 32. As the fullness increases, the multiplexer 300 is less capable of accommodating another program, and so the SRM 10 is signaled accordingly.

Figure 4:
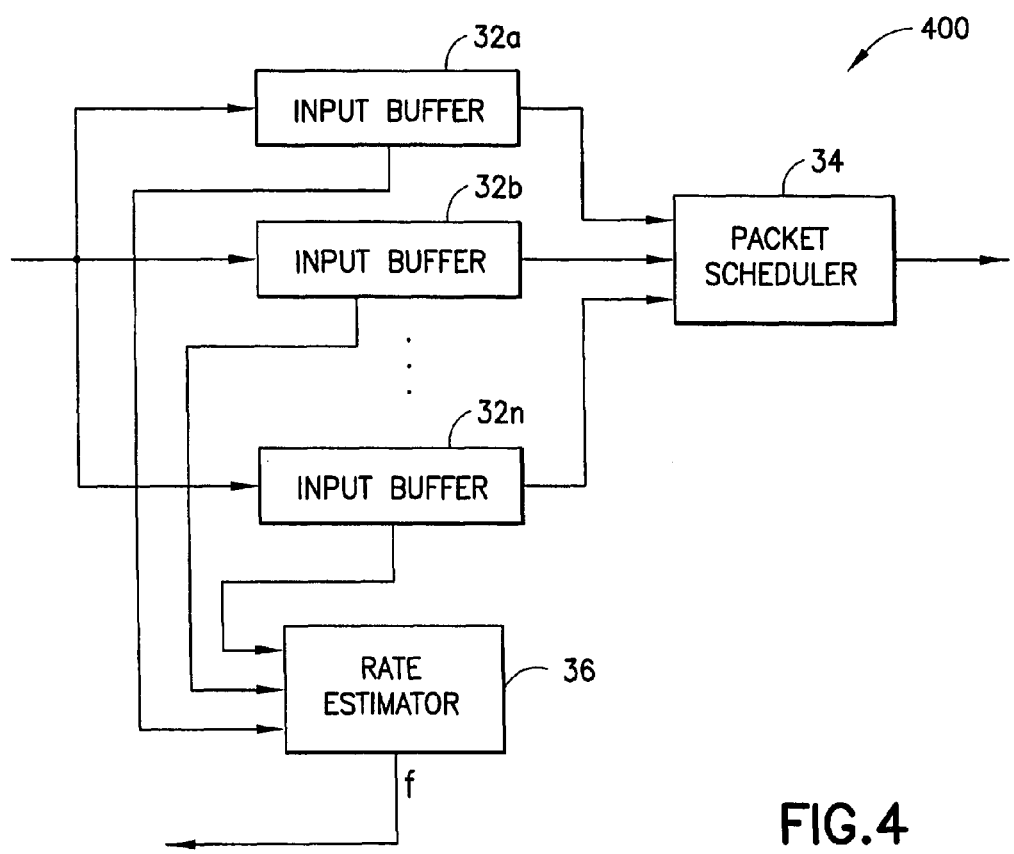
FIG. 4 shows a block diagram of an example embodiment of a multiplexer for use in the system of FIG. 1 or 2.

The simplified multiplexer embodiment of FIG. 3 can be modified as shown in FIG. 4, which illustrates an example embodiment of a multiplexer 400 for processing of multiple programs. In the example embodiment of FIG. 4, a separate Input Buffer (e.g., Input Buffer 32a, 32b, . . . , 32n) is associated with each program that is assigned to the multiplexer 400. Each buffer 32a, 32b, . . . , 32n is organized as a first in first out (FIFO) memory unit. As discussed above in connection with FIG. 3, the Packet Scheduler 34 attempts to send as many packets as the channel will accommodate and always prefers the next packet from the Input Buffers 32a, 32b, . . . , 32n corresponding to the program that is currently assigned highest priority. As with the example embodiment of FIG. 3, the Rate Estimator 36 generates the feedback parameter (f) to the SRM 10, but in this embodiment the result is based on the aggregate fullness of the individual buffers.

There is a disadvantage to estimating the feedback parameters based on the occupancy of the Input Buffers 32a, 32b, . . . , 32n. The buffers tend to remain mostly empty when the capacity of the channel is sufficient to accommodate all of the incoming traffic. This is true even when approaching the capacity limit of the channel, and at these times there may be little or no warning if the multiplexer is unable to accommodate another program. However, this is not a problem if the multiplexer features transrating capabilities as shown in the example embodiment of FIG. 5. In the multiplexer 500 shown in the example embodiment of FIG. 5, a Transrater (e.g., Transrater 38a, 38b, . . . , 38n) is used to regulate the rate of each program before the program data is deposited into a corresponding Input Buffer (e.g., Input Buffer 32a, 32b, . . . , 32n). It is also possible to place the corresponding Transrater after the Input Buffer, and such a post-transrater buffer would still be advantageous for decoupling the processing speed of the Transrater from the input requirements of the Packet Scheduler 34.

Figure 5:
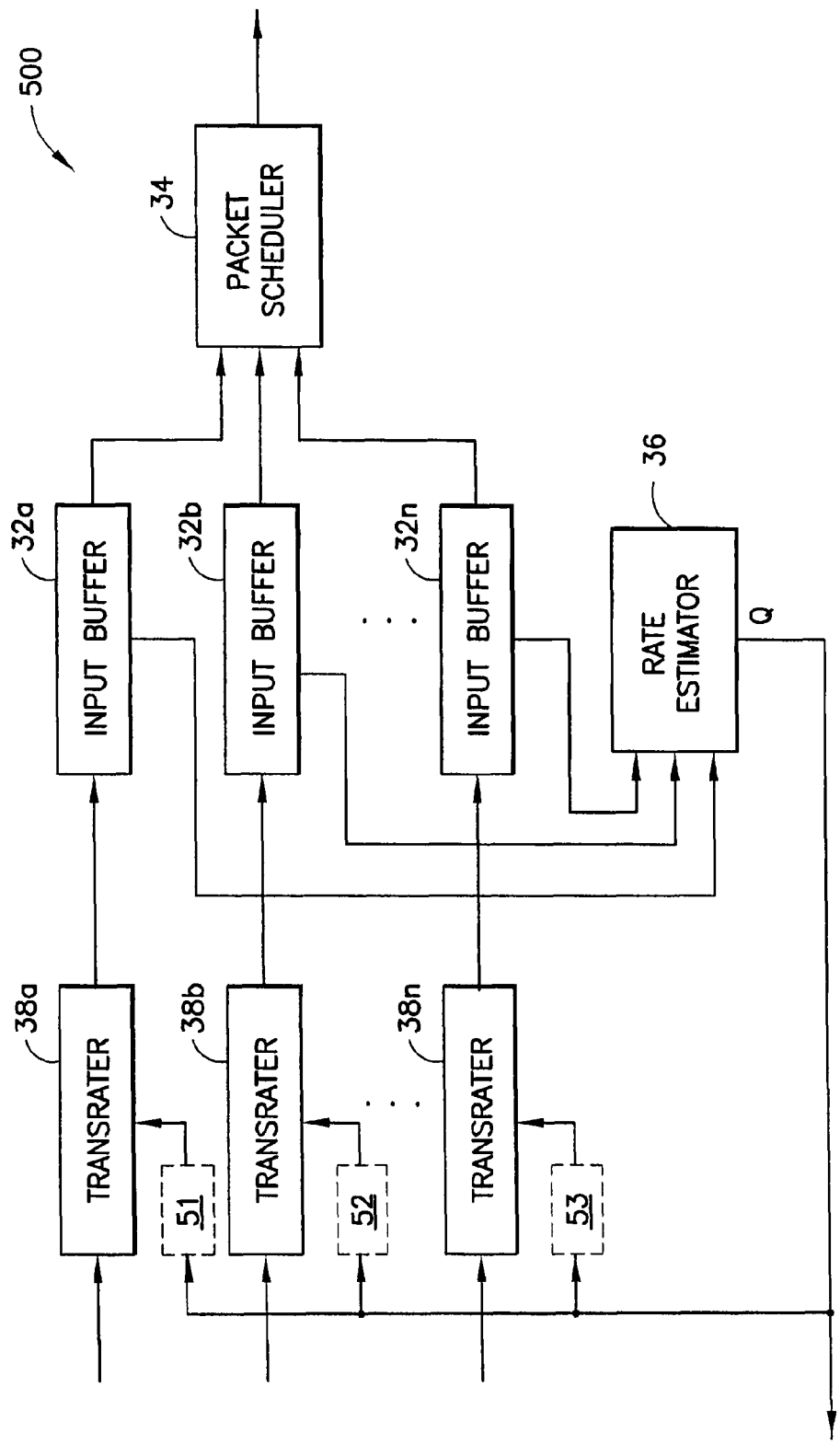
FIG. 5 shows a block diagram of an example embodiment of a multiplexer with transrating capabilities for use in the system of FIG. 1 or 2.

The example embodiment shown in FIG. 5 is able to receive input traffic at rates exceeding the capacity of the channel. By monitoring the buffer fullness, the Rate Estimator 36 is able to detect this mismatch of the input and output data rates and then instruct the individual Transraters 38a, 38b, . . . , 38n to reduce the rate of the corresponding input streams. Typically, the Rate Estimator 36 would derive a global quality level (Q) based on the current fullness of the Input Buffers 32a, 32b, . . . , 32n, and convey this global quality level to each of the Transraters 38a, 38b, . . . , 38n. The global quality level would remain high as long as the aggregate input rate remains below the capacity of the channel since the Input Buffers 32a, 32b, . . . , 32n would tend to remain empty in this case. However, as the aggregate input rate increases and eventually exceeds the capacity of the channel, the global quality level would be reduced in order to keep the Input Buffers 32a, 32b, . . . , 32n from overflowing. If there is little variation in the aggregate input rate, the rate control loop will settle into a steady-state condition.

In some cases, it may be desirable to assign higher or lower quality levels to certain streams, or it may be desirable to set maximum or minimum data rates independently for each stream. This can be done using optional modules 51, 52, and 53, shown in dashed lines in FIG. 5, which modify the global quality level based on individual requirements. For example, the global quality level could be biased upwards if a particular stream has been assigned higher than average priority, or biased downwards when the priority is reduced. Maximum data rate constraints can be implemented by performing a local rate control calculation using the same algorithm as used by the Rate Estimator 36 to derive the global level Q. However, in this case, only a single Input Buffer is considered and the assigned maximum data rate is substituted in place of the actual channel capacity. If the new calculation results in a quality level that is higher than the global level, then the new result is ignored and the global level continues to be used. However, if the calculation results in a quality level that is lower than the global level, then the global level is ignored and the local value is used instead. Similarly minimum data rate constraints can be implemented by again considering a single Input Buffer and by substituting the assigned minimum rate in place of the actual channel capacity. This time, the new result would be used only if it results in a higher level of image quality than the level corresponding to the global level Q. Minimum data rate assignments should be used sparingly since they can have an adverse effect on the stability of the rate control process.

The global quality level Q that is conveyed to each of the Transraters 38a, 38b, 38n may also be used as a suitable feedback parameter to the SRM 10. The global quality level Q is indicative of the video quality of all programs included in a particular multiplex. Therefore, if a new program is to be transmitted to one or more receivers, one may choose to assign it to the multiplex that is currently delivering the highest video quality level.

If possible, the multiplexes should be rebalanced when the variation in video quality levels among multiplexes becomes too large. In most systems, it is possible to move a program from one multiplex to another by instructing the receiver to re-tune to a different channel frequency. If the transition can be performed seamlessly, then the re-balancing operation can be performed at any time. Otherwise, such transitions should be limited to program changes, ad insertions, or other breaks encountered during the delivery of a stream.

One of the most difficult challenges is to design a Rate Estimation system that performs well in statistical multiplexing or remultiplexing environments, particularly since large buffers are often needed to accommodate the variable processing rates in processing sub-systems such as video transraters. The large buffers introduce delays which complicate the task of achieving stability while minimizing the amount of transrating that is needed. The goal is to maintain maximum possible picture quality across all programs while eliminating the possibility of data loss due to over-utilization of the transmission channel. A solution which effectively addresses this requirement is provided by example embodiments of the present invention, discussed below, which provide rate estimation for statistical multiplexers using predictive rate control.

Example Embodiments of Rate Estimation Based on PCR Prediction

An example embodiment of the present invention uses time-based predictions to send the last MPEG packet accumulated in the buffer after transrating, to calculate a level of quantization (Q). The inherent nature of the transmission, i.e. fixed rate transport stream, can be exploited to accurately predict the time when the last transrated packets will actually be transmitted. This time can be compared to the time, designated by a decode time stamp (DTS), by which a system target decoder (e.g., at receiver 26 of FIGS. 1 and 2) needs to receive the packets of a particular elementary stream. Each MPEG frame has a DTS associated with it, which is the latest time at which the decoder must decode the frame. The decoder should receive all the packets of the frame before this time expires. By comparing the two time values the system can determine how close it is before the decoder buffer underflows. The closer the difference the more the system needs to transrate, which will in turn reduce the bit rate and make sure that all the packets are transmitted to the decoder before the DTS expires. Using this algorithm the system can be configured to transmit more video streams, such that these streams are transrated most of the time to make sure that the physical transport stream bandwidth is not exceeded and is utilized in an efficient way.

Figure 6:
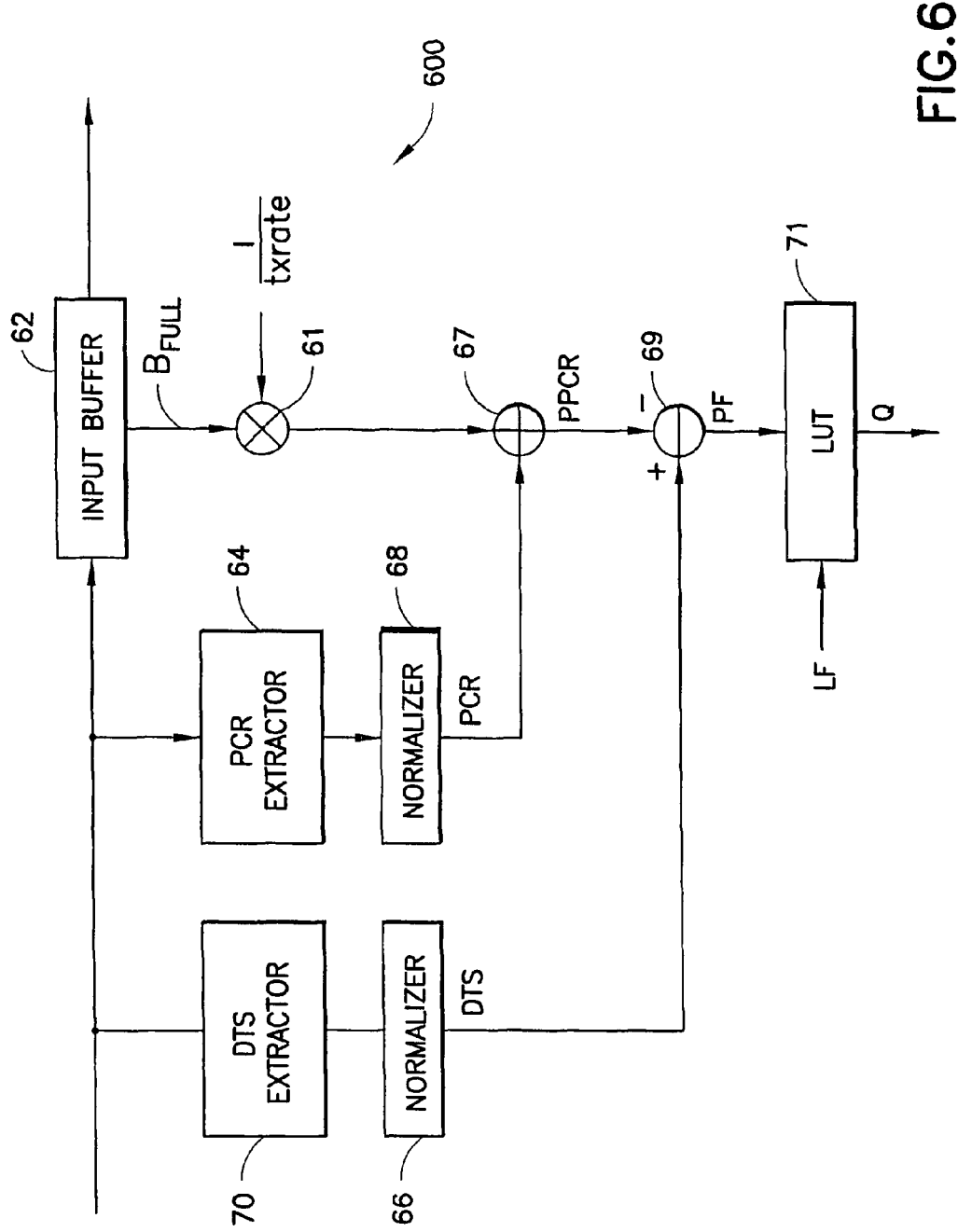
FIG. 6 shows a block diagram of an example embodiment of a portion of a multiplexer in accordance with the present invention.

In accordance with one example embodiment of the present invention as shown in FIG. 6, packets of a video stream are received at an Input Buffer 62 of a multiplexer 600. A transmission deadline is determined for the packets. A buffer fullness level $B_{full}$ of the Input Buffer 62 is also determined. A future time at which said packets can be transmitted may be estimated based on the buffer fullness level $B_{full}$. In such an example embodiment of the present invention, the algorithm assumes that the video frames are scheduled for transmission on an earliest-deadline-first basis.

A bit rate of the video stream can be adjusted based on the estimated future time and the transmission deadline (e.g., at a corresponding Transrater 38 as shown in FIG. 5). For example, the bit rate may be adjusted in proportion to a difference between the estimated future time and the transmission deadline.

A plurality of multiplexes may be formed (e.g., at corresponding multiplexers Mux 1, Mux 2, . . . Mux n as shown in FIGS. 1 and 2) and each multiplex may be comprised of at least one video stream. Each video stream may be subjected to the bit rate adjustment algorithm of the present invention. A current quality level setting may be determined for each multiplex based on the bit rate adjustments for each stream. The SRM 10 may assign a new video stream to the multiplex that has the highest quality level setting. In addition, a video stream may be reassigned from a multiplex with a low quality level setting to a multiplex with a higher quality level setting.

The buffer fullness level $B_{full}$ may be indicative of the total amount of data in the input buffer 62. Alternatively, the buffer fullness $B_{full}$ level may be indicative of the portion of data in the input buffer 62 which can be transrated to a lower rate.

MPEG streams also have an inherent way of measuring the current time. This time is well-known as the Program Clock Reference (PCR). In a further example embodiment of the present invention, the PCR for the video stream may provide a current time. The PCR may be obtained from a PCR extractor 64. The estimated future time may be provided by a predicted program clock reference (PPCR) derived from the current time and the buffer fullness level $B_{full}$. The PPCR may be determined by adding the PCR value of the video stream to a value indicative of an amount of time needed to transmit all of the data corresponding to the buffer fullness level (e.g., at adder 67). The value indicative of an amount of time needed to transmit all of the data corresponding to the buffer fullness level may be determined by dividing the buffer fullness $B_{full}$ level by a channel transmission rate (txrate) (or by multiplying the buffer fullness $B_{full}$ level by the inverse of the channel transmission rate 1/(txrate) at multiplier 61).

A decode time stamp (DTS) for a current frame (i.e., the last received frame at the Input Buffer 62) of the video stream may provide the transmission deadline. DTS is a very accurate measure of the transmission deadline. The DTS may be extracted from the video stream by DTS extractor 70. Since a multiplexer can multiplex elementary streams with different time bases, the time stamps of all the streams may need to be normalized to a common time base for calculations required by the algorithm of the present invention. For example, the DTS and PCR may be normalized to a common time base at DTS normalizer 66 and PCR normalizer 68, respectively.

A time difference may be determined by subtracting the PPCR from the DTS (e.g., at subtractor 69). The difference between the DTS and the PCR is the time for which a packet will sit in a buffer before it gets decoded (i.e., it is the time by which a decoder should receive all the packets associated with the frame). The bit rate for the video stream may be adjusted based on this time difference.

By comparing PPCR with DTS it can be accurately determined how close in time the Input Buffer 62 is to sending the last packet before the DTS expires. The bigger the time difference, the more time there is available to transmit the packets or the more transport packets that can be transmitted during that fixed time. Thus, the proximity of the PPCR and the DTS can be a good measure of the amount of transrating that would be required. The time difference determined from subtracting the PPCR from the DTS may comprise a proximity factor (PF).

The PF may be converted into a quality level Q having a value between 0 and N. This conversion may take place via a lookup table (LUT) 71. The mapping of the proximity factor (PF) to a quality setting Q can be further enhanced to yield more accurate results. For example, the design of sophisticated phase-locked tracking loops is well known in the art and such designs may be readily applied to this application.

The quality level Q may be provided in a feedback signal to at least one of session resource manager SRM 10 for use in assigning new programs to one of a plurality of transmission channels and a transrating device (e.g., one or more of transraters 38a-38n of FIG. 5) for use in adjusting the bit rate of the video stream.

In this case, Q may be assumed to have an inverse relationship with video quality. For example, Q would begin to increase as the proximity factor (PF) began to decrease, indicating that less time is available to deliver packets before the expiration of the DTS deadlines. Therefore, as Q increases, the transrater(s) must be instructed to reduce the data rate of the video signals. One way to achieve this result is to set the MPEG quantizer_scale_code parameter equal to Q.

In addition, system latency LF may be accounted for when converting the proximity factor PF to the quality level Q.

The same example algorithm discussed above in connection with FIG. 6 can be extended to the cases when there are more than one video stream (i.e., when there are a group of streams that needs to be multiplexed). A global quality parameter Q can be computed which is representative of the entire multiplex which contains multiple programs. Such an example embodiment is shown in FIG. 7.

Figure 7:
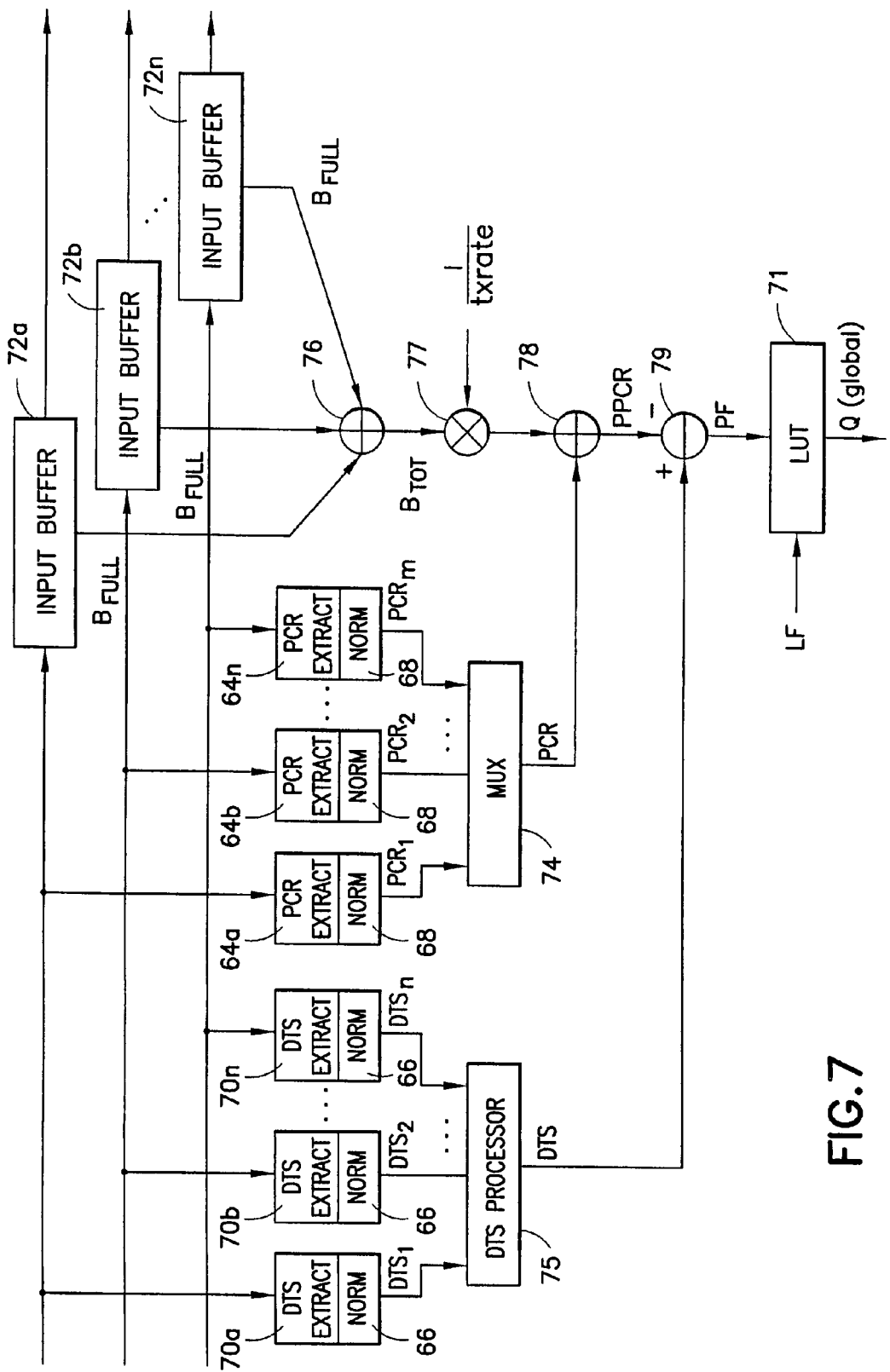
FIG. 7 shows a block diagram of a further example embodiment of a portion of a multiplexer in accordance with the present invention.

FIG. 7 shows multiple video streams received at corresponding input buffers $72a, 72b, \ldots, 72n$. A program clock reference (PCR) value may be determined for at least one of the multiple video streams (e.g., at PCR Extractor $64a$, $64b, \ldots, 64n$). A corresponding decode time stamp (DTSi) for a current frame of each of the multiple video streams may also be determined at DTS extractors $70a, 70b, \ldots, 70n$ (where "i" denotes a DTS for a particular one of the multiple streams (e.g., $DTS_1, DTS_2, \ldots DTS_n$). The decode time stamps (DTSis) and the program clock reference value (PCR) may be normalized to a common time base at normalizers 66 and 68 to obtain normalized DTSis (e.g., ..., $DTS_1$, $DTS_2, \ldots DTS_n$) and at least one normalized PCR (e.g., ..., $PCR_1, PCR_2, \ldots PCR_n$). A single normalized PCR may be selected at Multiplexer 74.

A representative DTS may be determined for the multiple video streams based on the normalized DTSis (e.g., at DTS processor 75). The representative DTS may comprise one of: (a) an average DTS obtained from averaging the normalized DTSis; (b) a median DTS obtained from taking a median value of the normalized DTSis; and (2) a minimum DTS obtained from taking a minimum DTS from the normalized DTSis.

The normalized PCR for at least one of the multiple video streams may provide a current time. The estimated future time may be provided by a predicted program clock reference (PPCR) derived from the current time and the buffer fullness levels $B_{full}$ from each input buffer $72a, 72b, \ldots, 72n$.

A time difference may be determined by subtracting the PPCR from the representative DTS (e.g., at subtractor 79). The bit rate may be adjusted based on the time difference.

The PPCR may be determined by adding the normalized PCR to a value indicative of an amount of time needed to transmit all of the data corresponding to the buffer fullness levels $B_{full}$ from each of the input buffers $72a, 72b, \ldots, 72n$ (e.g., at adder 78). The value indicative of an amount of time needed to transmit all of the data corresponding to the buffer fullness levels $B_{full}$ from each of the input buffers $72a$, $72b, \ldots, 72n$ is determined by summing the buffer fullness levels $B_{full}$ from each buffer (e.g., at adder 76) to obtain a total buffer fullness level $B_{tot}$ and then dividing the total buffer fullness level $B_{tot}$ by a channel transmission rate (txrate) (or by multiplying the total buffer fullness $B_{tot}$ level by the inverse of the channel transmission rate 1/(txrate) at multiplier 77).

The time difference determined from subtracting the PPCR from the representative DTS may comprise a proximity factor (PF). The PF may be converted into a global quality level Q having a value between 0 and N (e.g., at lookup table (LUT) 71). The global Q may be provided in a feedback signal to one or more video processors (e.g., Transraters $38a, 38b, \ldots, 38n$ of FIG. 5) for adjusting the bit rate of at least one of the multiple video streams. Alternatively or additionally, the global Q may be provided in a feedback signal to a session resource manager (e.g., SRM 10 of FIG. 1 or 2) for use in managing the assignment of video streams to selected multiplexes.

System latency may be accounted for when converting the proximity factor PF to the global Q. Accounting for the system latency may comprise determining a latency factor LF for the system latency and calculating the global Q using the formula:

$$Q=((LF-PF)*N)/LF$$

where LF=Constant*latency, the global Q may have an inverse relationship with video quality, the Constant provides a safety margin chosen to avoid buffer underflow, and the bit rate is adjusted in inverse proportion to Q. The value N is an arbitrary range bound. In an example embodiment, N may be set to a value between 0-31, which matches the range of the MPEG-2 quantizer scale code parameter.

For each of the multiple video streams, an MPEG quantizer scale code parameter may be set equal to the global Q in the event the global Q indicates a lower video quality level than an original MPEG quantizer scale code for the particular video stream.

Figure 8:
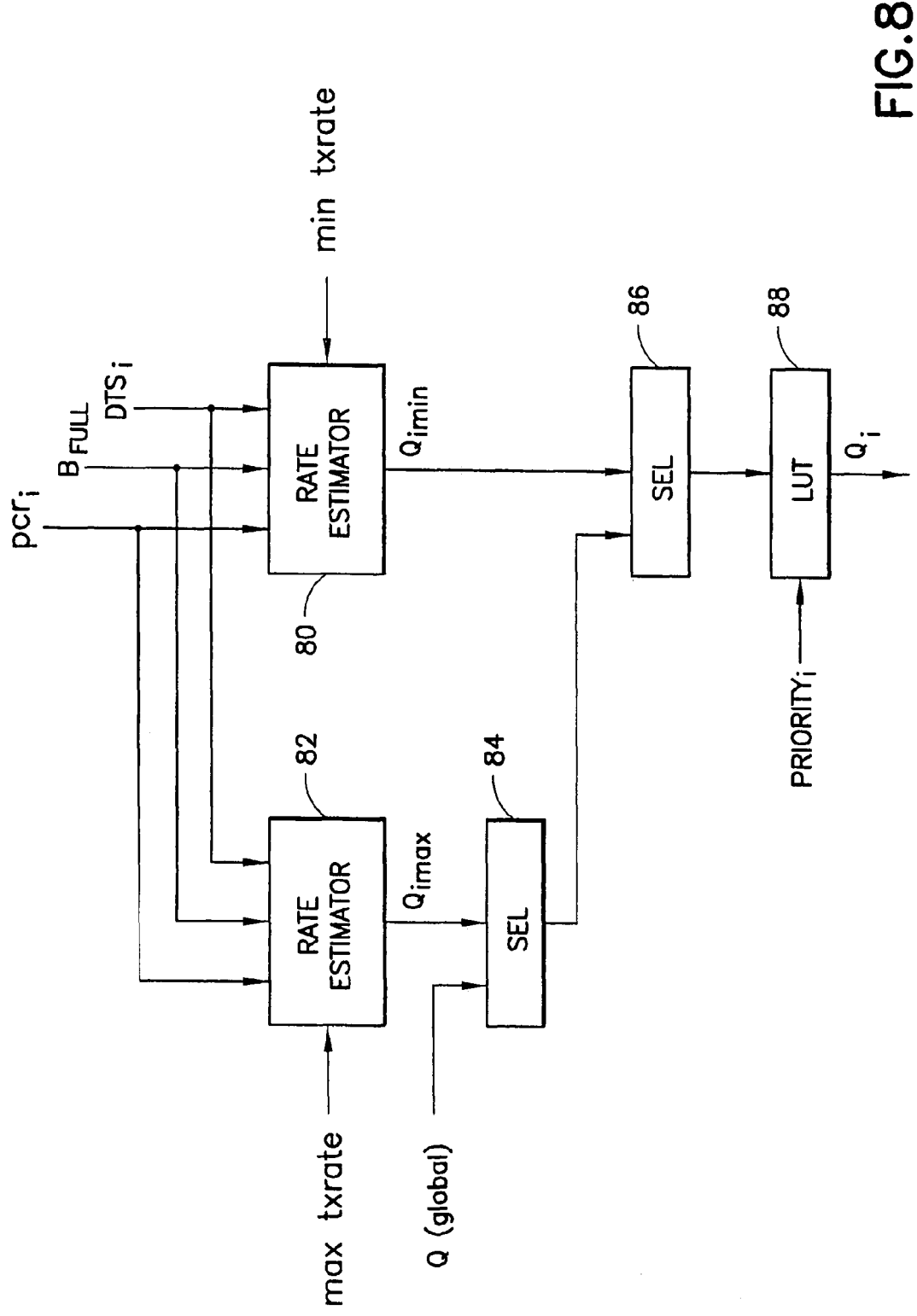
FIG. 8 shows a block diagram of further example of a portion of a multiplexer in accordance with the present invention.

In a further embodiment of the present invention as shown in FIG. 8, the same algorithm may be used to clamp individual streams to a maximum and/or a minimum rate. For example, at least one of an individual maximum quality level Qimax and an individual minimum quality level Qimin may be determined for each of the multiple video streams in addition to the global Q. The Qimax may be an indicator of a maximum video quality for a corresponding one of the multiple video streams. The Qimin may be an indicator of a minimum video quality for a corresponding one of the multiple video streams. Both of the Qimax and the Qimin may have an inverse relationship with video quality. For each of the multiple video streams:

$$Qi\text{min}=((LF-PFi\text{min})*N)/LF$$

where PFimin comprises an individual minimum proximity factor.

$$Qi\text{max}=((LF-PFi\text{max})*N)/LF$$

where PFimax comprises an individual maximum proximity factor.

$$PFi\text{min}=DTSi-PPCRi\text{min}$$

where PPCRimin comprises an individual minimum PPCR.

$$PFi\text{max}=DTSi-PPCRi\text{max}$$

where PPCRimax comprises an individual maximum PPCR.

For each of the multiple video streams, PPCRimin may be determined by adding the normalized PCR value to a value indicative of an amount of time needed to transmit all of the data corresponding to a buffer fullness level of the corresponding input buffer for the video stream at a specified minimum bit rate for the video stream. PPCRimin for each stream may be determined in the same way that PPCR is determined for a single stream as discussed in connection with FIG. 6 above, except that a minimum transmission rate (min txrate) for the video stream is used instead of the transmission rate (txrate).

Similarly, for each of the video streams, PPCRimax may be determined by adding the normalized PCR value to a value indicative of an amount of time needed to transmit all of the data corresponding to a buffer fullness level of the corresponding input buffer for the video stream at a specified maximum bit rate for the video stream. Likewise, PPCRimax for each stream may be determined in the same way that PPCR is determined for a single stream as discussed in connection with FIG. 6 above, except that a maximum transmission rate (max txrate) for the video stream is used instead of the transmission rate (txrate).

FIG. 8 shows an example embodiment of a portion of a multiplexer for selecting one of Qimax, Qimin, or the global Q for a single video stream. The global Q referred to in connection with the FIG. 8 embodiment is the global Q determined as discussed above in connection with FIG. 7. When only Qimax is determined (e.g. at rate estimator 82), Qimax may be selected rather than the global Q when adjusting the bit rate of a particular video stream if the Qimax for the particular stream indicates a lower quality image than the global Q. The global Q may be selected when adjusting the bit rate of a particular video stream if the global Q indicates a lower quality image than the Qimax for the particular stream. This selection between Qimax and the global Q may take place at Selector 84.

When only Qimin is determined (e.g., at rate estimator 80), Qimin may be selected rather than the global Q when adjusting the bit rate of a particular video stream if the Qimin for the particular stream indicates a higher quality image than the global Q. The global Q may be selected when adjusting the bit rate of a particular video stream if the global Q indicates a higher quality image than the Qimin for the particular stream. This selection between Qimin and the global Q may take place at Selector 86.

When both Qimin and Qimax are determined, Qimin may be selected when adjusting the bit rate of a particular video stream if the Qimin for the particular stream indicates a higher quality image than either the global Q or the corresponding Qimax. Qimax may be selected when adjusting the bit rate of a particular video stream if the Qimax for the particular stream indicates a lower quality image than the global Q and a higher quality image than the corresponding Qimin. The global Q may be selected when adjusting the bit rate of a particular video stream if the global Q indicates a lower quality image than the Qimax and a higher quality image than the Qimin. The selection between Qimin, Qimax, and the global Q may be carried out using selectors 84 and 86 in combination to provide an individual Qi for each video stream.

A multiplexer with transrating capabilities may be further optimized by distinguishing between the portion of data in the input buffer(s) (e.g., input buffer 62 in FIG. 6 or input buffers 72a-72n in FIG. 7) which may be rate controlled and the portion which cannot. In many systems, the video data may be rate controlled but audio and other data types must be forwarded at the same rate at which they are received. This distinction may be advantageously applied in an example embodiment of the present invention by considering only the transratable data when deriving the predicted program clock reference (PPCR) from the normalized PCR and by adjusting the latency factor (LF) depending on the amount of non-transratable data in the input buffer(s). For example, $B_{full}$ from Input Buffers 72a, 72b, . . . 72n may be defined as the amount of transratable video data in each corresponding Input Buffer. The resulting $B_{full}$ values from each buffer are then summed as before to form $B_{tot}$.

The time needed to transmit the non-transratable data must also be considered. One way to do this, is to modify the latency window used to convert the proximity factor PF to a quality setting Q. Since all non-transratable data must be transmitted during this latency window, it makes sense to reduce the duration of the window by the time needed to send this non-transratable data. If the amount of non-transratable data in an Input Buffer 72 is defined as $B_{nx}$, if the capacity of the transmission channel is defined as txrate, and if the total amount of non-transratable data in all Input Buffers 72a, 72b, . . . 72n is $B_{nx}$, then the latency factor can be calculated as:

$$LF = \text{constant} * (\text{latency} - B_{nx}/\text{txrate}).$$

This latency factor LF can now be used to calculate the global Q, Qimax, or Qimin from the respective proximity factors (PF) as before.

At least one of the global Q, the Qimin, and the Qmax may be adjusted based on a priority constant ($\text{Priority}_i$) indicating a priority level of the particular video stream (which may be provided to a lookup table (LUT) 88 to obtain the individual Qi for each stream.

It should be appreciated that priority adjustments using the priority constant are independent of the minimum or maximum clamping effect provided by Qimin and Qimax. The global Q may be adjusted in any arbitrary way on a stream-by-stream basis, as long as this causes higher priority streams to be degraded less than the low priority streams. Further, if applying the final derived Qi to a transrating system, and if a particular source stream already has a Q value indicating lower image quality, then this original Q should not be changed for this particular stream.

It should now be appreciated that the present invention provides advantageous methods, apparatus, and systems for balancing video distribution using feedback from the channel multiplexers, as well as for rate estimation and predictive rate control.

Although the invention has been described in connection with various illustrated embodiments, numerous modifications and adaptations may be made thereto without departing from the spirit and scope of the invention as set forth in the claims.

What is claimed is:

1. A method for rate estimation and rate control in a video distribution system, comprising:
    receiving packets of multiple video streams at corresponding input buffers;
    determining a transmission deadline for said packets;
    determining fullness levels of said input buffers;
    determining a program clock reference (PCR) value for at least one of said multiple video streams;
    determining a corresponding decode time stamp (DTSi) for a current frame of each of said multiple video streams;
    normalizing said decode time stamps (DTSis) and said program clock reference (PCR) value to a common time base to obtain normalized DTSis and a normalized PCR, the normalized PCR for at least one of said multiple video streams providing a current time;
    determining a representative DTS for said multiple video streams based on said normalized DTSis;
    estimating a future time at which said packets can be transmitted, the estimated future time being provided by a predicted program clock reference (PPCR) derived from said current time and buffer fullness levels;
    determining a time difference by subtracting said PPCR from said representative DTS, said time difference comprising a proximity factor (PF);
    converting said PF into a global quality level Q and accounting for system latency during said conversion by determining a latency factor (LF) for said system latency;

said global quality level Q being calculated using the formula Q=((LF−PF)*/LF, where N is an arbitrary range bound and Q has an inverse relationship with video quality; and adjusting a bit rate of at least one of said video streams in inverse proportion to Q based on at least one of said estimated future time, said time difference and said transmission deadline.

2. A method in accordance with claim 1, wherein:

said bit rate is adjusted in proportion to a difference between said estimated future time and the transmission deadline.

3. A method in accordance with claim 1, further comprising:

forming a plurality of multiplexes, each comprised of at least one video stream;

determining a current quality level setting for each multiplex based on said bit rate adjustments.

4. A method in accordance with claim 3, further comprising:

assigning a new video stream to the multiplex having the highest quality level setting.

5. A method in accordance with claim 3, further comprising:

reassigning a video stream from a multiplex with a low quality level setting to a multiplex with a higher quality level setting.

6. A method in accordance with claim 1, wherein the fullness level of each input buffer is indicative of the total amount of data in that input buffer.

7. A method in accordance with claim 1, wherein the fullness level of each input buffer is indicative of the portion of data in that input buffer which can be transrated to a lower rate.

8. A method in accordance with claim 1, wherein said PPCR is determined by:

adding said PCR value to a value indicative of an amount of time needed to transmit all of the data corresponding to the fullness level of at least one of said input buffers.

9. A method in accordance with claim 8, wherein said value indicative of an amount of time needed to transmit all of the data corresponding to the fullness level of at least one of said input buffers is determined by dividing that buffer fullness level by a channel transmission rate.

10. A method in accordance with claim 1, wherein:

a decode time stamp (DTS) for a current frame of one of said video streams provides said transmission deadline.

11. A method in accordance with claim 1, further comprising:

providing said Q in a feedback signal to at least one of a session resource manager for use in assigning new programs to one of a plurality of transmission channels and a transrater for use in adjusting the bit rate of at least one of said video streams.

12. A method in accordance with claim 1, wherein:

said representative DTS comprises one of:

(a) an average DTS obtained from averaging said normalized DTSis;

(b) a median DTS obtained from taking a median value of said normalized DTSis;

(c) a minimum DTS obtained from taking a minimum DTS from said normalized DTSis.

13. A method in accordance with claim 1, wherein:

said bit rate is adjusted based on said time difference.

14. A method in accordance with claim 1, wherein said PPCR is determined by:

adding said normalized PCR to a value indicative of an amount of time needed to transmit all of the data corresponding to said buffer fullness levels from each of said input buffers.

15. A method in accordance with claim 14, wherein said value indicative of an amount of time needed to transmit all of the data corresponding to said buffer fullness levels is determined by:

summing the buffer fullness levels from each buffer to obtain a total buffer fullness level;

dividing the total buffer fullness level by a channel transmission rate.

16. A method in accordance with claim 1, further comprising:

providing said global Q in a feedback signal to one or more video processors for adjusting the bit rate of at least one of said multiple video streams.

17. A method in accordance with claim 1, further comprising:

providing said global Q in a feedback signal to a session resource manager for use in managing the assignment of video streams to selected multiplexes.

18. A method in accordance with claim 1, wherein

LF=constant*latency and;

said constant provides a safety margin chosen to avoid buffer underflow.

19. A method in accordance with claim 1, wherein

LF=constant*(latency−Bnx/txrate);

wherein:

Bnx is an amount of non-transratable data in all of said input buffers combined;

txrate is a capacity of the transmission channel.

20. A method in accordance with claim 1, further comprising:

for each of said multiple video streams, setting an MPEG quantizer scale code parameter equal to said global Q in the event said global Q indicates a lower video quality level than an original MPEG quantizer scale code for the particular video stream.

21. A method in accordance with claim 1, further comprising:

determining at least one of an individual maximum quality level Qimax and an individual minimum quality level Qimin for each of said multiple video streams in addition to said global Q; wherein:

said Qimax is an indicator of a maximum video quality for a corresponding one of said multiple video streams;

said Qimin is an indicator of a minimum video quality for a corresponding one of said multiple video streams;

both of said Qimax and said Qimin have an inverse relationship with video quality.

22. A method in accordance with claim 21, wherein said Qimax is determined, further comprising:

selecting said Qimax when adjusting the bit rate of a particular video stream if said Qimax for said particular stream indicates a lower quality image than said global Q; and selecting said global Q when adjusting the bit rate of a particular video stream if said global Q indicates a lower quality image than said Qimax for said particular stream.

23. A method in accordance with claim 21, wherein said Qimin is determined, further comprising:
    selecting said Qimin when adjusting the bit rate of a particular video stream if said Qimin for said particular stream indicates a higher quality image than said global Q; and
    selecting said global Q when adjusting the bit rate of a particular video stream if said global Q indicates a higher quality image than said Qimin for said particular stream.

24. A method in accordance with claim 21, wherein both Qimin and Qimax are determined, further comprising:
    selecting said Qimin when adjusting the bit rate of a particular video stream if said Qimin for said particular stream indicates a higher quality image than either of said global Q and said Qimax;
    selecting said Qimax when adjusting the bit rate of a particular video stream if said Qimax for said particular stream indicates a lower quality image than said global Q and a higher quality image than said Qimin; and
    selecting said global Q when adjusting the bit rate of a particular video stream if said global Q indicates a lower quality image than said Qimax and a higher quality image than said Qimin.

25. A method in accordance with claim 21, further comprising:
    adjusting at least one of said global Q, said Qimin, and said Qmax based on a priority constant indicating a priority level of said particular video stream.

26. A method in accordance with claim 1, wherein said bit rate is adjusted based on said estimated future time and said transmission deadline.

27. A method in accordance with claim 1 wherein said bit rate is adjusted based on said estimated future time, said time difference and said transmission deadline.

28. A method for rate estimation and rate control in a video distribution system, comprising:
    receiving packets of multiple video streams at corresponding input buffers;
    determining a transmission deadline for said packets;
    determining fullness levels of said input buffers;
    determining a program clock reference (PCR) value for at least one of said multiple video streams;
    determining a corresponding decode time stamp (DTSi) for a current frame of each of said multiple video streams;
    normalizing said decode time stamps (DTSis) and said program clock reference (PCR) value to a common time base to obtain normalized DTSis and a normalized PCR, the normalized PCR for at least one of said multiple video streams providing a current time;
    determining a representative DTS for said multiple video streams based on said normalized DTSis;
    estimating a future time at which said packets can be transmitted, the estimated future time being provided by a predicted program clock reference (PPCR) derived from said current time and buffer fullness levels;
    determining a time difference by subtracting said PPCR from said representative DTS, said time difference comprising a proximity factor (PF);
    adjusting a bit rate of at least one of said video streams based on at least one of said estimated future time, said transmission deadline and said time difference;
    converting said PF into a global quality level Q;
    determining at least one of an individual maximum quality level Qimax and an individual minimum quality level Qimin for each of said multiple video streams in addition to said global Q; wherein:
    said Qimax is an indicator of a maximum video quality for a corresponding one of said multiple video streams;
    said Qimin is an indicator of a minimum video quality for a corresponding one of said multiple video streams; and
    both of said Qimax and said Qimin have an inverse relationship with video quality;
    wherein for each of said multiple video streams:

$Qimin=((LF-PFimin)*N)/LF$ where LF is a latency factor and PFimin comprises an individual minimum proximity factor; and $Qimax=((LF-PFimax)*N)/LF$ where PFimax comprises an individual maximum proximity factor.

29. A method in accordance with claim 28, wherein:

$PFimin=DTSi-PPCRimin$ and PPCRimin comprises an individual minimum PPCR; and $PFimax=DTSi-PPCRimax$ and PPCRimax comprises an individual maximum PPCR.

30. A method in accordance with claim 29, wherein for each of said multiple video streams:
    PPCRimin is determined by adding the normalized PCR value to a value indicative of an amount of time needed to transmit all of the data corresponding to a buffer fullness level of the corresponding input buffer for said video stream at a specified minimum bit rate for said video stream; and
    PPCRimax is determined by adding the normalized PCR value to a value indicative of an amount of time needed to transmit all of the data corresponding to a buffer fullness level of the corresponding input buffer for said video stream at a specified maximum bit rate for said video stream.

31. Apparatus for rate estimation and rate control in a video distribution system, comprising:
    a plurality of input buffers for receiving packets of multiple video streams and providing signals indicative of fullness levels of said input buffers;
    means for determining a transmission deadline for said packets;
    means for determining a program clock reference (PCR) value for at least one of said multiple video streams;
    means for determining a corresponding decode time stamp (DTSi) for a current frame of each of said multiple video streams;
    means for normalizing said decode time stamps (DTSis) and said program clock reference (PCR) value to a common time base to obtain normalized DTSis and a normalized PCR, the normalized PCR for at least one of said multiple video streams providing a current time;
    means for determining a representative DTS for said multiple video streams based on said normalized DTSis;
    means for estimating a future time at which said packets can be transmitted, the estimated future time being provided by a predicted program clock reference (PPCR) derived from said current time and buffer fullness levels;

means for determining a time difference by subtracting said PPCR from said representative DTS, said time difference comprising a proximity factor (PF);

means for converting said PF into a global quality level Q and accounting for system latency during said conversion by determining a latency factor (LF) for said system latency, means for calculating said global quality level Q using the formula $Q=((LF-PF)*N)/LF$, where Q has an inverse relationship with video quality; and means for adjusting a bit rate of at least one of said video streams based on said estimated future time, said time difference and said transmission deadline.

* * * * *

UNITED STATES PATENT AND TRADEMARK OFFICE
CERTIFICATE OF CORRECTION

| | | |
|---|---|---|
| PATENT NO. | : 7,885,189 B2 | Page 1 of 1 |
| APPLICATION NO. | : 11/801844 | |
| DATED | : February 8, 2011 | |
| INVENTOR(S) | : Krause et al. | |

It is certified that error appears in the above-identified patent and that said Letters Patent is hereby corrected as shown below:

Column 15, line 2: "Q=((LF-PF)*/LF" should read -- Q=((LF-PF)*N)/LF --

Column 15, line 43: delete the word "buffer"

Signed and Sealed this
Eighth Day of March, 2011

David J. Kappos
*Director of the United States Patent and Trademark Office*